US012609044B2

(12) United States Patent
Wolfe et al.

(10) Patent No.: US 12,609,044 B2
(45) Date of Patent: Apr. 21, 2026

(54) MACHINE LEARNING MODEL-GUIDED TRAINING AND DEVELOPMENT

(71) Applicant: Disney Enterprises, Inc., Burbank, CA (US)

(72) Inventors: Anna T. Wolfe, San Francisco, CA (US); Alexandra Hernandez, San Diego, CA (US); Anthony M. Accardo, Los Angeles, CA (US); Shelly Henling, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 857 days.

(21) Appl. No.: 17/861,051

(22) Filed: Jul. 8, 2022

(65) Prior Publication Data

US 2024/0013673 A1    Jan. 11, 2024

(51) Int. Cl.
    *G09B 19/00*     (2006.01)
    *G06N 20/00*     (2019.01)
    *G09B 5/06*     (2006.01)

(52) U.S. Cl.
    CPC ............. *G09B 19/00* (2013.01); *G06N 20/00* (2019.01); *G09B 5/06* (2013.01); *G09B 5/065* (2013.01)

(58) Field of Classification Search
    CPC . G09B 19/00; G09B 9/00; G09B 5/06; G09B 5/065; G06N 20/00; G06N 3/042; G06N 5/04
    See application file for complete search history.

(56) References Cited

U.S. PATENT DOCUMENTS

| | | | |
|---|---|---|---|
| 9,501,945 | B2 | 11/2016 | Wolf |
| 11,145,018 | B2 | 10/2021 | Oznur |
| 2007/0281287 | A1 | 12/2007 | Marioneaux |
| 2015/0006124 | A1 | 1/2015 | Lavole et al. |
| 2015/0006214 | A1 | 1/2015 | Lavoie et al. |
| 2016/0260044 | A1 | 9/2016 | Sabet |
| 2017/0066023 | A1 | 3/2017 | Stolze |

(Continued)

OTHER PUBLICATIONS

Elaine D. Pulakos "Performance Management: A roadmap for developing, implementing and evaluating performance management systems" SHRM Foundation, Society For Human Resource Management dated 2004 pp. 1-56.

(Continued)

*Primary Examiner* — Jerry-Daryl Fletcher
(74) *Attorney, Agent, or Firm* — Farjami & Farjami LLP

(57) ABSTRACT

A system for creating accessibility enhanced content includes a computing platform having processing hardware and a system memory storing a software code and a machine learning (ML) model, the software code providing a graphical user interface (GUI). The processing hardware executes the software code to identify a user of the system, obtain a user profile of the user, obtain, from one or more application(s) utilized by the user, activity data relating to use of the application(s) by the user, and modify, using the user profile and the activity data, one or more node weights of the ML model to provide a tuned ML model. The processing hardware further executes the software code to infer, using the tuned ML model, at least one action for advancing a development of the user and output to the user, using the UI, a recommendation for performing the at least one action by the user.

20 Claims, 5 Drawing Sheets

(56) References Cited

U.S. PATENT DOCUMENTS

| | | |
|---|---|---|
| 2017/0293874 A1 | 10/2017 | Asaf |
| 2019/0066023 A1 | 2/2019 | Von Jan et al. |
| 2022/0058973 A1 | 2/2022 | Doshi et al. |
| 2022/0300884 A1* | 9/2022 | Sabharwal ....... G06Q 10/06395 |

OTHER PUBLICATIONS

Erion Cano, Maurizio Morisio "Hybrid Recommender Systems: A Systematic Literature Review" Jan. 12, 2019.
Pulakos, Elaine D. "Performance Management: A roadmap for developing, implementing and evaluating performance management systems" 2004 pp. 1-56.

* cited by examiner

Fig. 3

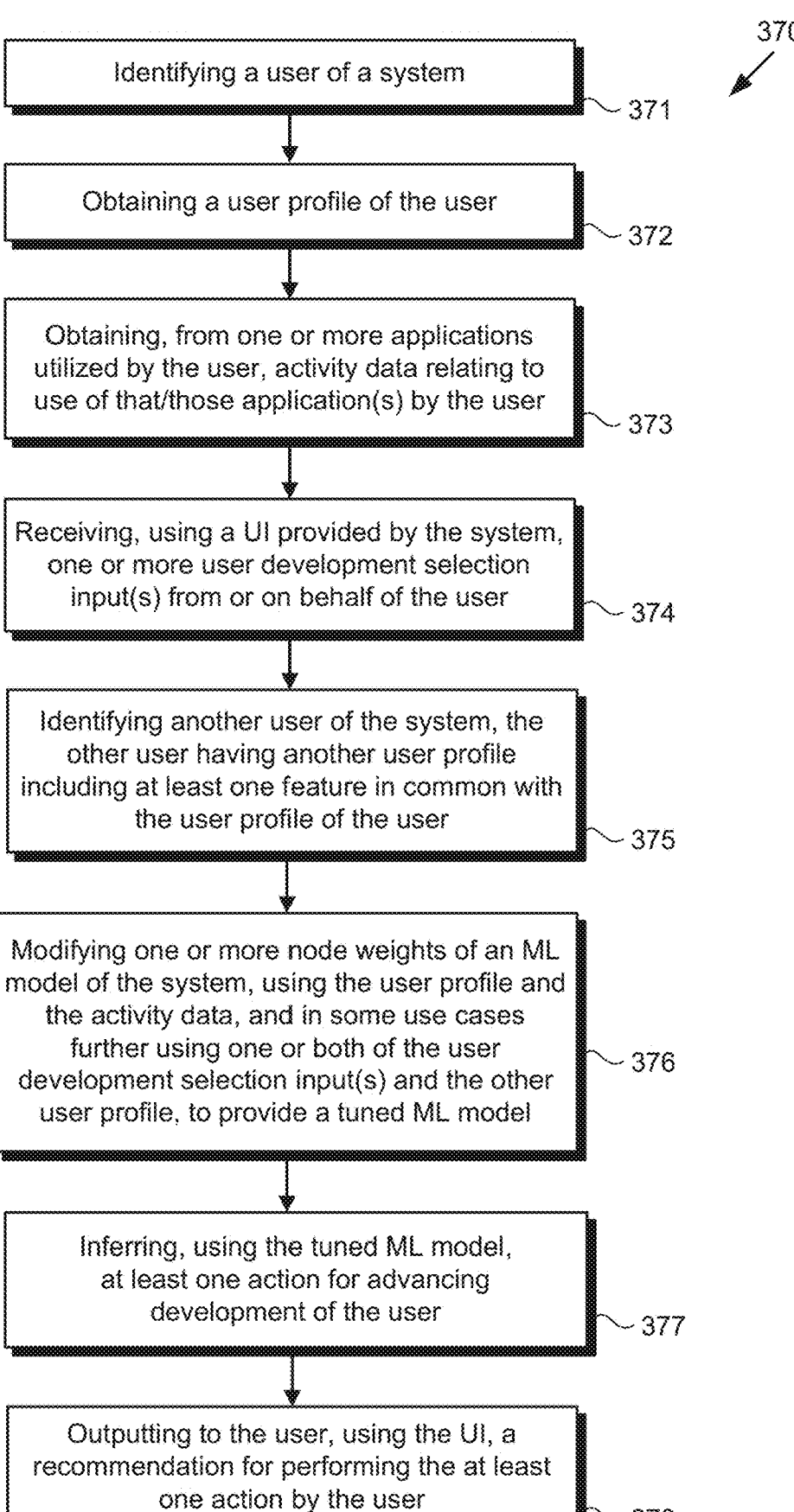

370

Identifying a user of a system — 371

Obtaining a user profile of the user — 372

Obtaining, from one or more applications utilized by the user, activity data relating to use of that/those application(s) by the user — 373

Receiving, using a UI provided by the system, one or more user development selection input(s) from or on behalf of the user — 374

Identifying another user of the system, the other user having another user profile including at least one feature in common with the user profile of the user — 375

Modifying one or more node weights of an ML model of the system, using the user profile and the activity data, and in some use cases further using one or both of the user development selection input(s) and the other user profile, to provide a tuned ML model — 376

Inferring, using the tuned ML model, at least one action for advancing development of the user — 377

Outputting to the user, using the UI, a recommendation for performing the at least one action by the user — 378

Fig. 4

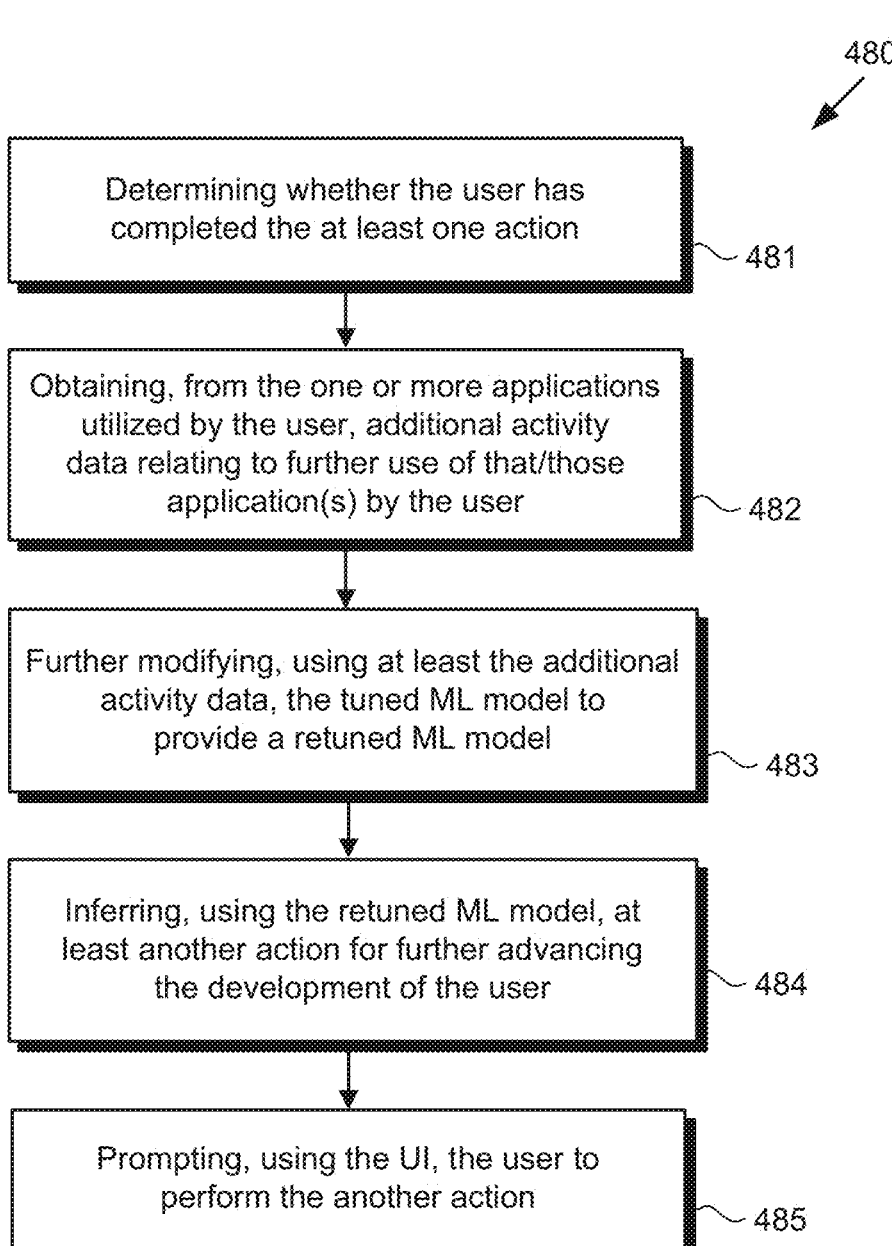

480

Determining whether the user has completed the at least one action ~ 481

Obtaining, from the one or more applications utilized by the user, additional activity data relating to further use of that/those application(s) by the user ~ 482

Further modifying, using at least the additional activity data, the tuned ML model to provide a retuned ML model ~ 483

Inferring, using the retuned ML model, at least another action for further advancing the development of the user ~ 484

Prompting, using the UI, the user to perform the another action ~ 485

MACHINE LEARNING MODEL-GUIDED TRAINING AND DEVELOPMENT

BACKGROUND

Conventional approaches to training and development in an organizational setting tend to be reactive rather than proactive for several reasons. For instance, it can be difficult and time consuming to identify core competencies that a large organization may need to develop in its members. Moreover, it is typically easier to offer introductory training or bulk learning resources at scale than to provide long-term individually curated guidance in identifying relevant learning and networking opportunities. In addition, for some organizations, particularly those in technology intensive industries, training needs often change rapidly along with industry changes, making it difficult to predict what specific skills are worth investing in. However, when opportunities for development fail to address the particular needs of individuals, or when individuals are unaware of opportunities that do address their interests and needs, it is less likely that those individuals will pursue them. In order for effective development to occur and progress, individuals need to be informed of training, networking, and mentoring options that are available them, as well as be able to participate in the identification of their own training pathways. Organizations are at risk of losing some of their most curious, ambitious, and potentially productive personnel if they do not provide them with a strategic, informative, and individualized approach to training and. development.

BRIEF DESCRIPTION OF THE DRAWINGS

FIG. 3 shows a flowchart presenting an exemplary method for providing automated ML model-guided training and development, according to one implementation; and FIG. 4 shows a flowchart including additional actions for extending e exemplary method outlined in FIG. 3, according to one implementation.

DETAILED DESCRIPTION

Figure 1:
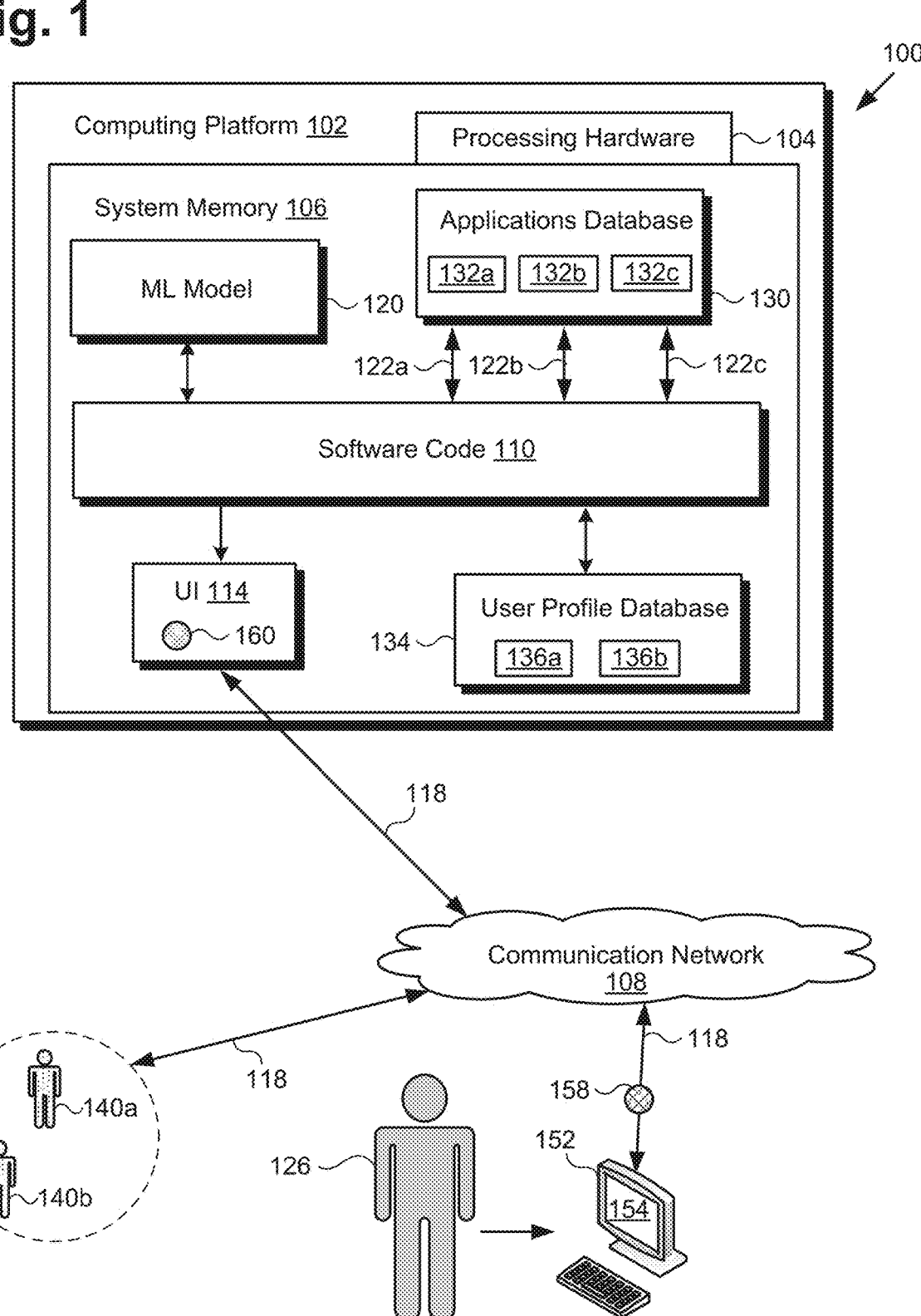
FIG. 1 shows an exemplary system for providing automated machine-learning (ML) model-guided training and development, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing machine learning (ML) model-guided training and development. As stated above, conventional approaches to training and development in an organizational setting tend to be reactive rather than proactive. There are a number of valid reasons for that lack of proactivity, including the. typically human labor intensive and costly process of remaining abreast of rapidly changing communication technologies, information technologies, and market changes in the sector in which an organization seeks to be competitive. Those challenges make curating individualized and targeted training and development opportunities for individual members or employees of such an organization a prohibitively impracticable concierge service when approached using conventional techniques.

The novel and inventive systems and methods disclosed in the present application advance the state-of-the-art by introducing an artificial intelligence (AI) inspired automated ML model-guided training and development solution capable of mating member or employee of an organization aware of one or more actions, such as one or more of training, networking, or mentoring opportunities for example, tailored to that individual's developmental needs and aspirations. Those actions may be communicated via a personally curated, and in some implementations prioritized, list displayed via a user interface (UI) of the system. As a result, the present concepts advantageously enable organizations to identify and retain their most curious, ambitious, and potentially productive personnel by providing them with a strategic, informative, and individualized approach to training and development.

It is noted that the actionable developmental opportunities surfaced to members or employees of an organization by the present ML model-guided training and development solution may involve a variety of mediums including online courses, in-person workshops, expert resources such as mentoring, collegial resources such as networking, and content of widely varying types. Examples of the types of training and developmental recommended by the present systems and methods may include audio-video content having both audio and video components, video unaccompanied by audio, or audio content unaccompanied by video. In addition, or alternatively, in some implementations, the type of content that is recommended according to the present novel and inventive principles may be or include digital representations of persons, fictional characters, locations, objects, and identifiers such. as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the ML model-guided training and development solution disclosed by the present application may also recommend training and. developmental content that is a hybrid of traditional audio-video and fully immersive VR/AR/MR experiences, such as interactive video.

As used in the present application, the terms "automation," "automated," and "automating" refer to systems and processes that do not require the participation of a human analyst or editor. Although, in some implementations, a human resources administrator or other system administrator may review or modify the training and developmental recommendations inferred by the automated systems and according to the automated methods described herein, that human involvement is optional. Thus, the methods described in the present application may be performed under the control of hardware processing components of the disclosed automated systems.

It is also noted that, as defined in the present application, the expression "machine learning model" may refer to a mathematical model for making future predictions based on patterns learned from samples of data or "training data." For example, machine learning models may be trained to perform image processing, natural language processing (NLP), and other inferential processing tasks. Various learning algorithms can be used to map correlations between input data and output data. These correlations form the mathematical model that can be used to make future predictions on new input data. Such a predictive model may include one or more logistic regression models, Bayesian models, or artificial neural networks (NNs), A "deep neural network," in the context of deep learning, may refer to a NN that utilizes multiple hidden layers between input and output layers, which may allow for learning based on features not explicitly defined in raw data. As used in the present application, a feature identified as a NN refers to a deep neural network.

FIG. 1 shows an exemplary system for providing automated ML model-guided training and development, according to one implementation. As shown in FIG. 1, system 100 includes computing platform 102 having processing hardware 104 and system memory 106 implemented as a computer-readable non-transitory storage medium. According to the present exemplary implementation, system memory 106 stores software code 110, ML model 120, applications database 130 including applications 132a, 132b, and 132 and user profile database 134 including user profiles 136a and 136b. Also shown in FIG. 1 is user interface (UI) 114 provided by software code 110, recommendation 160 for performing one or more actions displayed or spoken via UI 114, and application programming interfaces (APIs) 122a, 122b, and 122c of respective applications 132a, 132b, and 132c.

As further shown in FIG. 1, system 100 is implemented within a use environment including communication network 108, user system 152 including display 154, and user 126 of system 100 and user system 152. In addition, FIG. 1 shows other users 140a and 140b of system 100. Also shown in FIG. 1 are network communication links 118 of communication network 108 interactively connecting system 100 with user system 152 and a communication device utilized by each of other users 140a and 140b (communication devices of user 140a and 140b not shown in FIG. 1), as well as user development selection input 158 received by system 100 from user system 152.

It is noted that although applications database 130 is shown o include three applications, 132a, 132b, and 132c, that representation is merely exemplary. In other implementations, applications database 130 may include as few as one application, or more than three applications, such as ten applications, or more, It is further noted that although user profile database 134 is depicted as including two user profiles, that representation too is provided merely by way of example. More generally, user profile database 132 may include a user profile for each user of system 100, such as each of hundreds, thousands, or tens of thousands of users of system 100, for example. Thus, exemplary other users 140a and 140b of system 100 may correspond to hundreds, thousands, or tens of thousands of other users of system 100.

Although the present application refers to software code 110, ML model 120, applications database 130, and user profile database 134 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Moreover, although FIG. 1 depicts to software code 110, ML model 120, applications database 130, and user profile database 134 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100. Consequently, in some implementations, one or more of software code 110, ML model 120, applications database 130, and user profile database 134 may be stored remotely from one another on the distributed memory resources of system 100. It is also noted that, in some implementations, ML model 120 may take the form of one or more software modules included in software code 110.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI processes such as machine learning.

In some implementations, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines.

It is further noted that, although user system 152 is shown as a desktop computer in FIG. 1, that representation is provided merely by way of example. In other implementations, user system 152 may take the form of any suitable mobile or stationary computing device or system that implement data processing capabilities sufficient to provide UI 114, support connections to communication network 108, and implement the functionality ascribed to user system 152 herein. That is to say, in other implementations, user system 152 may take the form of a laptop computer, tablet computer, digital media player, game console, or a wearable communication device such as a smartwatch. AR viewer, or VR headset, to name a few examples.

It is also noted that display 154 may take the form of a liquid crystal display (LCD), a light-emitting diode (LED) display, an organic light-emitting diode (OLED) display, a quantum dot (QD) display, or any other suitable display screen that perform a physical transformation of signals to light. Furthermore, display 154 may be physically integrated with user system 152 or may be communicatively coupled to but physically separate from user system 152. For example, where user system 152 is implemented as a smartphone, laptop computer, of tablet computer, display 154 will typically be integrated with user system 152. By contrast, where user system 152 is implemented as a desktop computer, display 154 may take the form of a monitor separate from user system 152 in the form of a computer tower.

Figure 2A:
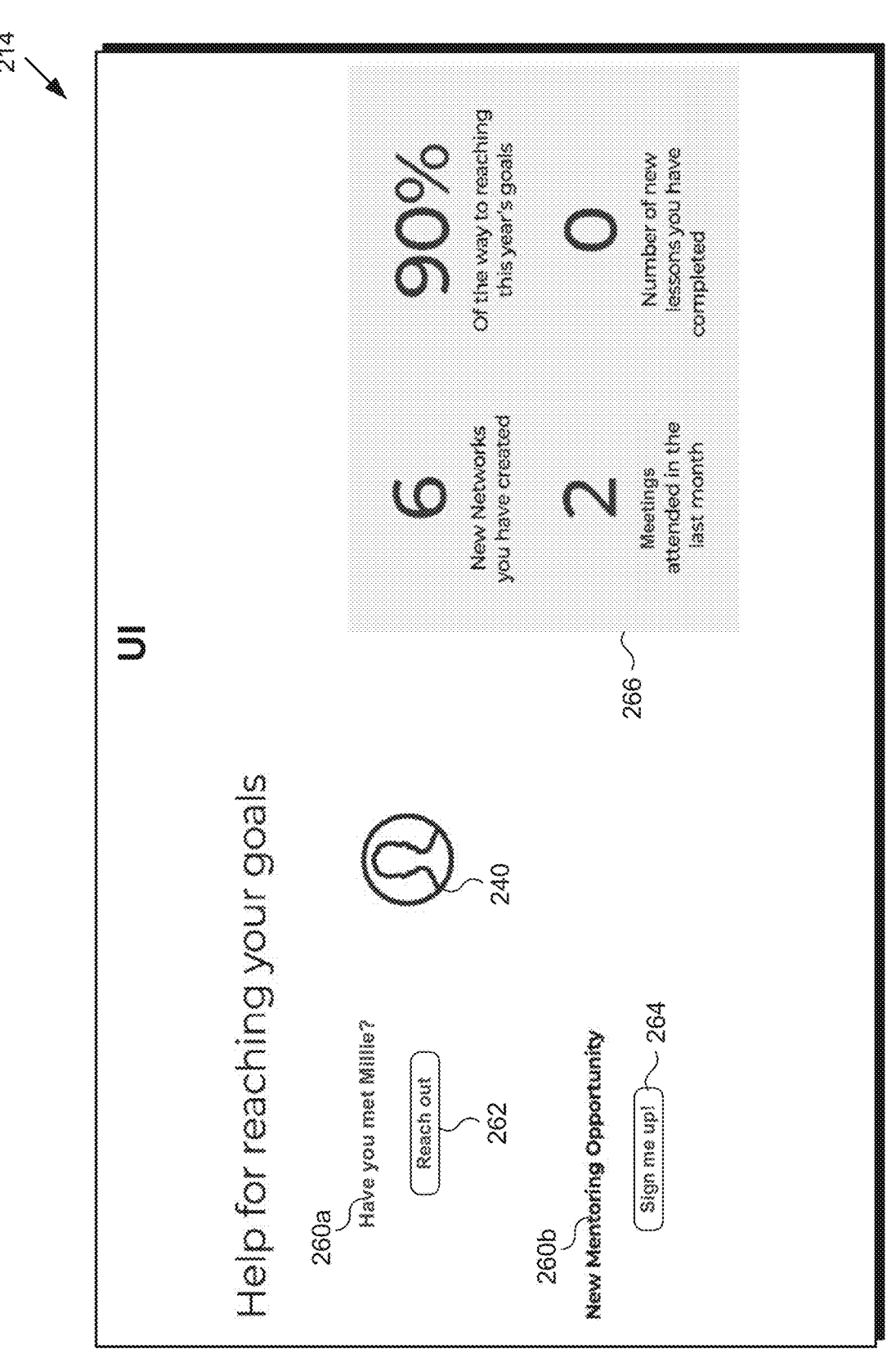
FIG. 2A shows training and development information and recommendations displayed via a user interface (UI) provided by the software code of the system shown in FIG. 1, according to one implementation.

FIG. 2A shows training and development information and recommendations displayed via UI 214 provided by software code 110 of system 100 in FIG. 1, according to one implementation. As shown in FIG. 2A, UI 214 displays recommendations 260a and 260b for respective actions 262 and 264 to be performed by a system user (hereinafter "user 126" in FIG. 1) in order to make progress towards reaching goals of user 126. For example, recommendation 260a prompts user 126 to perform action 262 and "reach out" to another user 240 of system 100 named Millie, inferred or predicted (hereinafter "inferred") to be an advantageous contact for user 126 in advancing the development of user 126 in an organization common to user 126 and other user 240. In addition, recommendation 260b prompts user 126 to perform action 264 and sign up for a mentoring opportunity inferred to be of value to user 126. UI 214 also displays dashboard 266 identifying the progress by user 126 towards accomplishing their goals for the year, which include actions such as creating networks, attending meetings, and completing lessons, to name a few examples.

It is noted that UI 214, in FIG. 2A, corresponds in general to UI 114, in FIG. 1. Consequently, UI 214 may share any of the characteristics attributed to UI 114 by the present disclosure, and vice versa. Moreover, recommendations 260a and 260b, in FIG. 2A, correspond in general to recommendation 160, in FIG. 1, while other user 240 of system 100 corresponds in general to either of other users 140a or 140b of system 100.

Figure 2B:
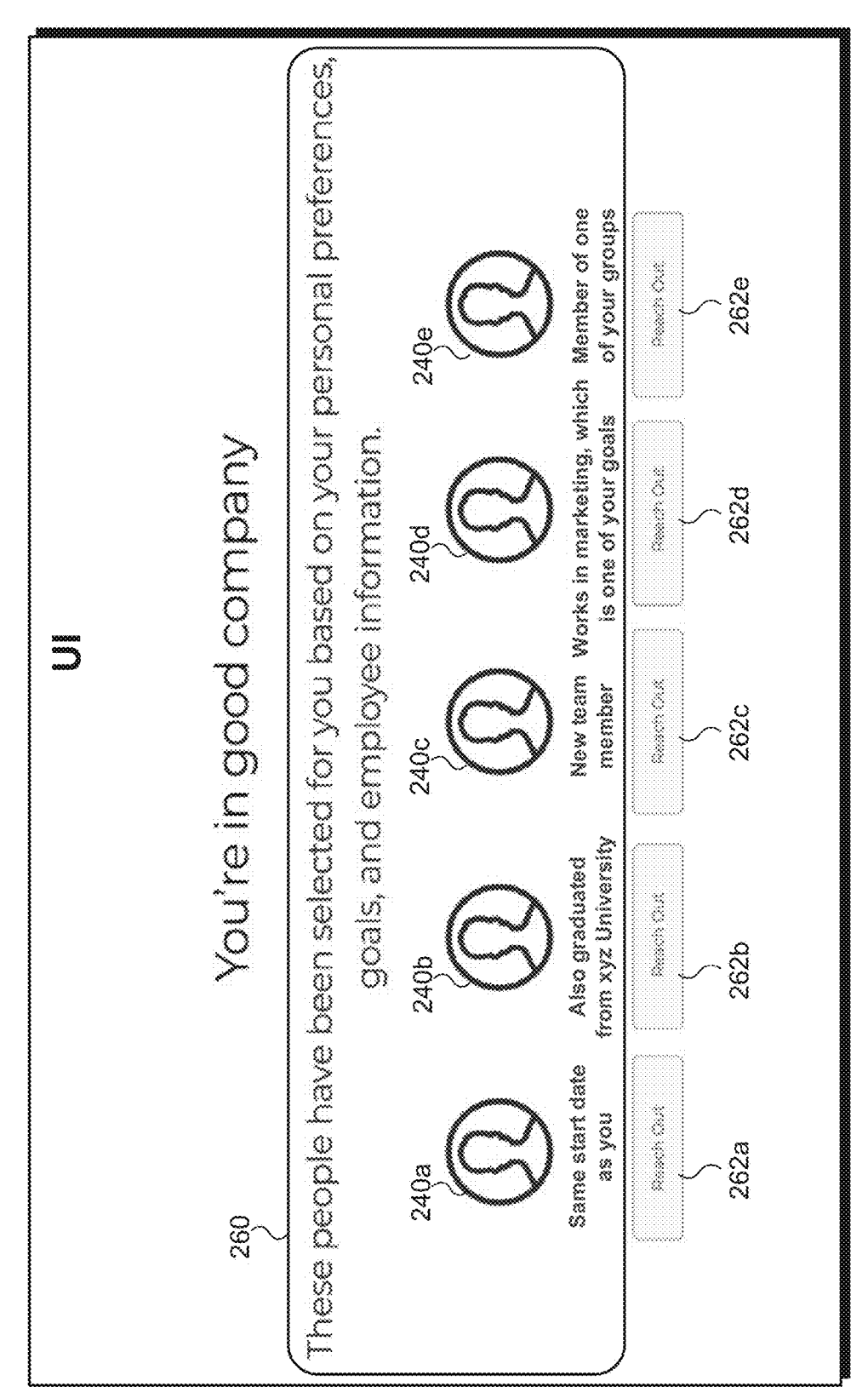
FIG. 2B shows additional training and development information and recommendations displayed via the UI provided by the software code of the system shown in FIG. 1, according to one implementation.

FIG. 2B shows additional training and development information and recommendations displayed via UI 214, according to one implementation. Referring to FIGS. 1 and 2B in combination, UI 114/214 displays recommendation 260 identifying other users 240a, 240b, 240c, 240d, and 240e (hereinafter "other users 240a-240e") of system 100 who have been inferred to be potentially advantageous contacts for user 126 of system 100, based on a variety of criteria.

For example, recommendation 260 prompts user 126 to perform action 262a and "reach out" to other user 240a of system 100 having the same start date, e.g., enrolment date or date of hire, as user 126. In addition, recommendation 260 prompts user 126 to perform action 262b and "reach out" to other user 240b who is an alumnus of the same university attended by user 126, as well as to perform action 262c and "reach out" to other user 240c who has newly joined the team to which user 126 is also a member. Recommendation 260 also prompts user 126 to perform action 262d and "reach out" to other user 240d who works in a department to which user 126 aspires, and to perform action 262e and "reach out" to other user 240e who is a member of a group to which user 126 also belongs, but whom user 126 is inferred to be presently unfamiliar.

Like UI 214 in FIG. 2A, UI 214 in FIG. 2B corresponds in general to UI 114, in FIG. 1. Moreover, recommendation 260, in FIG. 2B, corresponds in general to recommendation 160, in FIG. 1, as well as to recommendation 260a, in FIG. 2A, while other users 240a-240e of system 100 correspond variously to any of other users 140a, 140b, and 240 of system 100.

The functionality of system 100 and software code 110 will be further described by reference to FIG. 3. FIG. 3 shows flowchart 370 presenting an exemplary method for providing automated ML model-guided training and development, according to one implementation. With respect to the method outlined in FIG. 3, noted that certain details and features have been left out of flowchart 370 in order not to obscure the discussion of the inventive features in the present application.

Referring to FIG. 3 in combination with FIG. 1, flowchart 370 begins with identifying user 126 of system 100 (action 371). As shown in FIG. 1, user 126 utilizes user system 152 to interact with system 100 via communication network 108 and network communication links 118. In one implementation, for example, user 126 may be identified in action 371 based on login credentials for user 126, such as a username and password, received from user system 152. Alternatively, or in addition, some implementations, user 126 may be identified in action 371 based on a unique device identifier of user system 152. Identification of user 126 in action 371 may be performed by software code 110, executed by processing hardware 104 of computing platform 102.

Flowchart 370 further includes obtaining a user profile of user 126. As shown in FIG. 1, system 100 includes user profile database 134 storing user profiles 136a and 136b. As noted above by reference to FIG. 1, user profile database 132 may include a user profile for each user of system 100, such as each of hundreds, thousands, or tens of thousands of users of system 100, for example. One of those stored user profiles, hereinafter user profile 136a, is the user profile of user 126. Thus, user profile 136a of user 126 of system 100 may be obtained in action 372 by being retrieved from user profile database 134 of system 100. User profile 136a may be obtained in action 372 by software code 110, executed by processing hardware 104 of computing platform 102.

Flowchart 370 further includes obtaining, from one or more applications utilized by user 126, activity data relating to use of that/those application(s) by user 126 (action 373). As shown in FIG. 1, system 100 includes applications database 130 storing applications 132a, 132b, and 132c. As noted above by reference to FIG. 1, although applications database 130 is depicted as storing three applications, in various implementations applications 132a, 132b, and 132c may correspond to more than three applications, such as ten applications, or more.

Applications 132a, 132b, and 132c may include some or all of a group messaging application, an instant messaging (IM) application, an email application, a calendaring application, and a human resources (HR) interface application, to name merely a few examples. Moreover, applications 132*a*, 132*b*, and 132*c* may include applications from a variety of different software publishers, such as Microsoft®, Slack®, and Zoom®, to name merely a few examples. The activity data obtained from one, some, or all of applications 132*a*, 132*b*, and 132*c* may be obtained via respective APIs 122*a*, 122*b*, and 122*c*. Action 373 may be performed by software code 110, executed by processing hardware 104 of computing platform 102.

Flowchart 370 may also include receiving, using UI 114, a user development selection input 158 from or on behalf of user 126 (action 374). It is noted that action 374 is optional, in some implementations may be omitted from the method outlined by flowchart 370. Action 374, when performed, may provide user 126 with a menu of development opportunities from which user 126 may select one or more, or may enable user 126 to one or more of identify their own goals, author their own development, plan, or request access to a specific development opportunity, for example. Alternatively, or in addition, action 374 may provide a manager or supervisor of user 126 with a menu of development opportunities from which the manager or supervisor may select one or more on behalf of user 126, or may enable the manager or supervisor to one or more of identify goals for user 126, author their own development plan, or request access to a specific development opportunity. That is to say, user development selection input 158 may include one or more of a menu selection by or on behalf of user 126, goals identified by on behalf of user 126, a development plan authored by or on behalf of user 126, or a developmental request by or on behalf of user 126. Action 374 may be performed by software code 110, executed by processing hardware 104 of computing platform 102.

As noted above, action 374 is optional and may be omitted from the method outlined by flowchart 370. However, in implementations in which action 374 is perforated action 374 may follow action 373, as represented in FIG. 3, or n ay precede action 373. Furthermore, in some implementations of the present method in which action 374 is performed, actions 373 and 374 may be performed in parallel, i.e., contemporaneously.

Flowchart 370 may also include identifying another user of system 100, that other user having another user profile including at least one feature in common with user profile 136*a* of user 126 (action 375). Examples of such features in common may include one or more of age, hire date, educational or employment history, and professed interests, to name a few. It is noted that, like action 374, action 375 is optional, in some implementations may be omitted from the method outlined by flowchart 370. Action 375, when performed, enables implementation of a collaborative filtering approach to the automated identification of potentially advantageous development opportunities for user 126. By way of example, where other user 140*b* having user profile 136*b* has an educational or employment background similar to user 126, works in a related department, or joined the same organization within a predetermined time window of user 126, user profile 136*b* of other user 140*b* may be a valuable resource for use in inferring actions be taken by user 126 to advance the development of user 126 Action 375 may be performed by software code 110, executed by processing hardware 104 of computing platform 102.

As noted above, action 375 is optional and may be omitted from the method outlined by flowchart 370. However, in implementations in which action 375 is performed, action 375 may follow directly from action 373, may follow action 374, as represented in FIG. 3, or may precede either of actions 373 or 374. Furthermore, in some implementations of the present method in which one or both of actions 374 and 375 are performed, actions 373 and 375, actions 374 and 375, or actions 373, 374, and 375, may be performed in parallel, i.e., contemporaneously.

Flowchart 370 further includes modifying, using user profile 136*a* of user 126 and the activity data obtained in action 373, one or more node weights of ML model 120 to provide a tuned ML model (action 376). It is noted that in some implementations, the same ML model 120 may be individually tuned for each user of system 100, or for each of multiple groups of users of system 100, to advantageously enable automation of the process of curating developmental recommendations specific to each individual user or to each group of users. In other words, in some implementations, the same ML model 120 may be tuned in action 376 to provide a user or group specific tuned ML model.

In some use cases, ML model 120, once tuned in action 376, may be configured to implement a content-based filtering strategy at inference time. In those instances, data aggregated from user profile 136*a* of user 126, the activity data obtained in action 373, and optionally, user development selection input 158, may be used to modify the one or more node weights of ML model 120. Alternatively, or in addition, in sonic use cases, ML model 120, once tuned in action 376, may be configured to implement a collaborative filtering strategy at inference time. In those instances, modifying the one or more node weights of ML model 120 may further use the user profile 136*b* of other user 140*b* identified in action 375. Thus, in various use cases, ML model 120, once tuned in action 376, may be configured to implement a content-based filtering strategy, a collaborative filtering strategy, or may be configured as a hybrid model implementing both content-based filtering and collaborative filtering. Modification of the one or more: nod weights of ML model 120 to provide a tuned ML model (hereinafter "tuned ML model 120"), in action 376, may be performed by software code 110, executed by processing hardware 104 of computing platform 102.

Flowchart 370 further includes inferring, using tuned ML model 120, at least one action for advancing the development of user 126 (action 377). The potential action or actions inferred using tuned ML model 120 may take a variety of forms. By way of example, that action may include one or more of initiating a communication with another user of system 100 by "reaching out" to that other user, or joining an existing group including other users of system 100. Alternatively, or in addition, the action or actions inferred using tuned ML model 120 may include one or more of attending or proactively organizing an event including one or more other users of system 100, engaging in an educational activity either as a student or a teacher, or assuming the role of a mentor or mentees. The inference of at least one action for advancing the development of user 126 may be performed by software code 110, executed by processing hardware 104 of computing platform 102, and using tuned ML model 120.

Flowchart 370 further includes outputting to user 126, using UI 114, recommendation 160 for performing the at least one action inferred using trained ML model 120, by user 126 (action 378). In some implementations, recommendation 160 may identify a single action, such as "reach out" to another user, to sign up as a teacher or student or to serve as a mentor or mentee, or to join an existing group/event or organize a group or an event for other users of system 100, for example. However, in other implementations recommendation 160 may identify multiple actions for advancing the development of user 126. Moreover, in some of those implementations, recommendation 160 may take the form of a prioritized list of multiple actions, based, for example, on the inferred importance with respect to advancing the development of user 126. Action 378 may be performed by software code 110, executed by processing hardware 104 of computing platform 102, and using UI 114.

It is noted that, in some implementations, it may advantageous or desirable to ensure that recommendation 160 identifies actions that are not only suitable for user 126, but are compliant with the principles of diversity and explicability. With respect to diversity the aim is to avoid recommending actions that are too similar to each other, e.g., overlap, while still providing suggestions that are a good fit for the user. Finding that balance may include calculating the difference distance between different recommended actions and ensuring that the difference distance is within a predetermined range, i.e., neither too great nor too small. Software code 110, when executed by processing hardware 104 of computing platform 102, could then output recommendation 160 identifying one or more actions that meet these requirements in order to promote exploration by user 126 while maintaining focus on advancing the development of user 126.

Regarding explicability, it is desirable to maintain the confidence of user 126 in the recommendations output by system 100. This may be achieved by providing an explanation for each recommended action such as: "Since you attended this diversity training, you may be interested in attending event A." Without explicability in this circumstance, user 126 may be more likely to lose confidence in recommendation 160 output by system 100 if they do not understand the motivation for recommendation 160.

FIG. 4 shows flowchart 480 including additional actions for extending the exemplary method outlined in FIG. 3, according to one implementation. With respect to the action described in FIG. 4, it is noted that certain details and features have been left out of flowchart 480 in order not to obscure the discussion of the inventive features in the present application.

Referring to FIG. 4 in combination with FIG. 1, flowchart 480 may include determining whether user 126 has completed the at least one action for advancing the development of user 126 that was identified in recommendation 160 (action 481). It is noted that action 481 is optional, in some implementations may be omitted from the method outlined by flowchart 480. In implementations in which action 481 is performed, the determination of whether user 126 has completed the at least one action may be made using one or more of various potential inputs, including one or more of self-reporting by user 126, or affirmative reporting by another user of system 100 in the role of student, teacher, mentor, mentee, or group or event participant in the action or actions identified by recommendation 160. Alternatively, or in addition, that determination may be made in response to receiving course completion or certification data, or based on the use one or more of applications 132a, 132b, or 132c by user 126. Action 481 may be performed by software code 110, executed by processing hardware 104 of computing platform 102.

Flowchart 480 further includes obtaining, from one or more applications utilized by user 126, additional activity data relating to further use of that/those application(s) by user 126 (action 482). That is to say, the additional activity data obtained in action 482 differs from the activity data obtained in step 373 by capturing further activity by user 126 after recommendation 160 has been Output to user 126 in action 378, and occurs whether or not the recommended action has been performed by user 126. As noted above, system 100 includes applications database 130 storing applications 132a, 132b, and 132c. As further noted above, applications 132a, 132b, and 132c may include some or all of a group messaging application, an IM application, an email application, a calendaring application, and a UR interface application, to name merely a few examples. Moreover and as also noted above, applications 132a, 132b, and 132c may include applications from a variety of different software publishers. The further activity data obtained from some or all of applications 132a, 132b, and 132c in action 482 may be obtained via respective APIs 122a, 122b, and 122c. Action 482 may be performed by software code 110, executed by processing hardware 104 of computing platform 102.

It is noted that although flowchart 480 shows action 482 as following action 481, that representation is merely exemplary. In other implementations, action 482 may precede action 481. Moreover, in some implementations, actions 481 and 482 may be performed in parallel, i.e., contemporaneously.

Flowchart 480 further includes further modifying, using the additional activity data obtained in action 482 and, in some implementations, whether user 126 has completed the at least one action identified by recommendation 160, one or more node weights of tuned ML model 120 to provide a retuned ML model (action 483). The further modification of the one or more node weights of tuned ML model 120 to provide a retuned ML model corresponding to tuned ML model 120, in action 483, may be performed by software code 110, executed by processing hardware 104 of computing platform 102.

It is noted that actions 481, 482, and 483 serve to implement a three hundred and sixty degree (360°) feedback loop. Software code 110 may be configured to translate engagement with applications 132a, 132b, and 132c, as well as external business applications, to Key Performance Indicator (KPI) data in order to link user activity to completion of development goals. For example, trends and patterns quantify the progress towards identified goals by user 126 may be quantified based on the activity of user 126 with respect to applications 132a, 132b, and 132c. Data from applications 132a, 132b, and 132c may also be cross-referenced such that data from one of applications 132a, 132b, or 132c can be used to retrieve data from one or more others of applications 132a, 132b, or 132c.

As a specific example of the foregoing, software code 110, when executed by processing hardware 104 of computing platform 102, may be configured to determine a list of other users of system 100 that user 126 communicates with regularly using an email application and then use the data from an HR application to determine the respective status of each of those other users within an organization. If user 126 is consistently networking with peers having the same status, software code 110 may output recommendation 160 suggesting that user 126 connect with another user in a more senior role within the hierarchy of the organization in order to gain more knowledge about the management of the organization.

Once the KPI data based on the engagement of user 126 with applications 132a, 132b, and 132c has been determined, that KPI data can be used to further modify tuned ML, model 120, thereby completing the 360° feedback loop. Another way software code 110 can feed output data back into the feedback loop is by the user's responsiveness in taking action in response to recommendation 160 output by system 100, i.e., whether user 126 has completed the at least one action identified by recommendation 160. Alternatively, or in addition, the consequences of the performance, by user 126, of the action recommended action may be included in the feedback loop. For example, recommendation 160 may include advising user 126 to reach out and connect with other user 140*a,* as well as to other user 140*b.* User 126 does so, and based on the additional activity data received in action 482, it is learned that user never communicates with other user 140*b* again, but routinely communicates with other user 140*a.* In response to the apparently more meaningful connection of user 126 with other user 140*a,* ML model 120 may be tuned so as to more heavily weight the overlapping features between user 126 and other user 140*a* than the overlapping features between user 126 and other user 140*b.*

For instance, additional activity data obtained from a group messaging application can be transplanted as inputs for further modifying the node weights of tuned ML model 120. As one such example, the number of group chats user 126 is included in versus the amount of time that user 126 engages in those group chats can be used to gauge the level of participation by the user. As another example, the number of new people reached out to on a monthly basis, as well as how much time user 126 spends chatting with other user in their department versus how many other users from other departments can be used to track networking activities. As another example, response time by user 126 during different time periods can be used to determine when user 126 is most productive and when user 126 is busy, e.g., when they can be more productive with their time. As yet another example, the organizational status of other users interacted with can be used to determine if user 126 is getting visibility from organizational leadership and can provide metrics used in goal tracking.

In addition, or alternatively, additional activity data obtained from an email or calendaring application can be transplanted as inputs for further modifying the node weights of tuned ML model 120. As one such example, the number of department activities or meetings that user 126 attends can provide a metric for engagement by user 126 with other users. As another example, other users included in meetings with user 126 can be used to obtain information about the other users that user 126 is interacting with, which can be used in advancing achievement of goals for user 126. As yet another example, free time on the calendar of user 126 can be used to ascertain when user 126 is available and most likely to be free to meet with new members of the organization.

Flowchart 480 further includes inferring, using the retuned ML model corresponding to tuned ML model 120, another action for further advancing the development of user 126 (action 484). The potential action or actions inferred in action 484 may take any of the variety of forms described above by reference to action 377. The inference of another action for further advancing the development of user 126 may be performed by software code 110, executed by processing hardware 104 of computing platform 102, and using the retuned ML model corresponding to tuned ML model 120.

In some implementations, flowchart 480 may conclude with action 484 described above. However, on other implementations, flowchart 480 further includes prompting, using UI 114, user 126 to perform the other action for advancing the development of user 126 that was inferred in action 484

(action 485). Action 485 may be performed by software code 110, executed by processing hardware 104 of computing platform 102, and using UI 114.

With respect to the method outlined by flowcharts 370 and 480, it is noted that, in some implementations, actions 371, 372, and 373 (hereinafter "actions 371-373"), and actions 376, 377, and 378 (hereinafter "action 376-378"), or actions 371-373, 374, and 376-378, or actions 371-373, 375, and 376-378, or actions 371-373, 374, 375, and 376-378, or actions 371-373 376-378, and actions 481, 482, 483, and 484 (hereinafter "actions 481-484"), or actions 371-373, 374, 376-378, and 481-484, or actions 371-373, 375, 376-378, and 481-484, or actions 371-373, 374, 375, 376-378 and 481-484, or actions 371-373, 376-378, 481-484, and 485, or actions 371-373, 374, 376-378, 481-484, and 485 or actions 371-373, 375, 376-378, 481-484, and 485, or actions 371-373, 374, 375, 376-378, 481-484, and 485, or actions 371-373, 376-378, and actions 482, 483, and 484 (hereinafter "actions 482-484"), or actions 371-373, 374, 376-378, and 482-484, or actions 371-373, 375, 376-378, and 482-484, or actions 371-373, 374, 375, 376-378, and 482-484, or actions 371-373, 376-378, 482-484, and 485, or actions 371-373, 374, 376-378, 482-484, and 485, or actions 371-373, 375, 376-378, 482-484, and 485, or actions 371-373, 374, 375, 376-378, 482-484, and 485, may be performed in an automated process from which human participation may be omitted.

Thus, the present application discloses systems and methods for providing ML model-guided training and development. The novel and inventive systems and methods disclosed in the present application advance the state-of-the-art by introducing an AI inspired automated training and development solution capable of making a member or employee of an organizations aware of one or more actions, such as one or more of training, networking, or mentoring opportunities for example, tailored to that individual's developmental needs and aspirations, without imposing prohibitive costs or resource demands on the organization. As a result, the present concepts advantageously enable organizations to identify and retain their most curious, ambitious, and potentially productive personnel by providing them with a strategic, informative, and individualized approach to training and development.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present plication is not limited to the particular implementations described herein, but many rearrangements, modifications, and substitutions are possible without departing from the scope of the present to disclosure.

What is claimed is:
1. A system comprising:
a computing platform including processing hardware and a system memory;
a software code and a machine learning (ML) model including a plurality of node weights stored in the system memory, the software code providing a user interface (UI);

the processing hardware configured to execute the software code to:

identify a user of the system;

obtain a user profile of the user;

obtain, from respective application programming interfaces (APIs) of one or more applications utilized by the user, activity data relating to use of the one or more applications by the user;

modify, using the user profile and the activity data, one or more of the plurality of node weights of the ML model to provide a tuned ML model configured to implement at least one of a content-based filtering strategy or a collaborative filtering strategy;

infer, using the tuned ML model, at least one action for advancing a development of the user;

output to the user, using the UI, a recommendation identifying the at least one action;

obtain, from the respective APIs of the one or more applications utilized by the user, additional activity data relating to further use of the one or more applications by the user; and further modify, using the additional activity data in a closed-loop feedback process in which user behavior drives ongoing modification of model parameters, the tuned ML model to provide a retuned ML model.

2. The system of claim 1, wherein the at least one action comprises a plurality of actions for advancing the development of the user, and wherein the recommendation comprises a prioritized list of the plurality of actions.

3. The system of claim 1, wherein the processing hardware is further configured to execute the software code to:

receive, using the UI, a user development selection input from or on behalf of the user;

wherein modifying the one or more of the plurality of node weights of the ML model further uses the user development selection input.

4. The system of claim 1, wherein the processing hardware is configured to execute the software code to:

identify another user of the system, the another user having another user profile including at least one feature in common with the user profile of the user;

wherein modifying the one or more of the plurality of node weights of the ML further uses the another user profile.

5. The system of claim 1, wherein the at least one action for advancing the development of the user comprises initiating a communication with another user of the system.

6. The system of claim 1, wherein the at least one action for advancing the development of the user comprises joining an existing group including a plurality of other users of the system.

7. The system of claim 1, wherein the at least one action for advancing the development of the user comprises organizing or attending an event including at least one other user of the system.

8. The system of claim 1, wherein the at least one action for advancing the development of the user comprises engaging in an educational activity as one of a student or a teacher.

9. The system of claim 1, wherein processing hardware is further configured to execute the software code to:

infer, using the retuned ML model, another action for further advancing the development of the user.

10. The system of claim 9, wherein processing hardware is further configured to execute the software code to:

determine whether the user has completed the at least one action; and prompt, using the UI, the user to perform the another action.

11. A method for use by a system including a computing platform having processing hardware and a system memory storing software code and a machine learning (ML) model including a plurality of node weights, the software code providing a user interface (UI), the method comprising:

identifying, by the software code executed by the processing hardware, a user of the system;

obtaining, by the software code executed by the processing hardware a user profile of the user;

obtaining, by the software code executed by the processing hardware, from respective application programming interfaces (APIs) of one or more applications utilized by the user, activity data relating to use of the one or more applications by the user;

modifying, by the software code executed by the processing hardware and using the user profile and the activity data, one or more of the plurality of node weights of the ML model to provide a tuned ML model configured to implement at least one of a content-based filtering strategy or a collaborative filtering strategy;

inferring, by the software code executed by the processing hardware and using the tuned ML model, at least one action for advancing a development of the user;

outputting to the user, by the software code executed by the processing hardware and using the UI, a recommendation identifying the at least one action;

obtaining, by the software code executed by the processing hardware, from the respective APIs of the one or more applications utilized by the user, additional activity data relating to further use of the one or more applications by the user; and further modifying, by the software code executed by the processing hardware and using the additional activity data in a closed-loop feedback process in which user behavior drives ongoing modification of model parameters, the tuned ML model to provide a retuned ML model.

12. The method of claim 11, wherein the at least one action comprises a plurality of actions for advancing the development of the user, and wherein the recommendation comprises a prioritized list of the plurality of actions.

13. The method of claim 11, further comprising:

receiving, by the software code executed by the processing hardware and using the UI, a user development selection input from or on behalf of the user;

wherein modifying the one or more of the plurality of node weights of the ML model further uses the user development selection input.

14. The method of claim 11, further comprising:

identifying, by the software code executed by the processing hardware, another user of the system, the another user having another user profile including at least one feature in common with the user profile of the user;

wherein modifying the one or more of the plurality of node weights of the ML model further uses the another user profile.

15. The method of claim 11, wherein the at least one action for advancing the development of the user comprises initiating a communication with another user of the system.

16. The method of claim 11, wherein the at least one action for advancing the development of the user comprises joining an existing group including a plurality of other users of the system.

17. The method of claim 11, wherein the at least one action for advancing the development of the user comprises organizing or attending an event including at least one other user of the system.

18. The method of claim 11, wherein the at least one action for advancing the development of the user comprises engaging in an educational activity as one of a student or a teacher.

19. The method of claim 11, further comprising:

inferring, by the software code executed by the processing hardware and using the retuned ML model, at least another action for further advancing the development of the user.

20. The method of claim 19, further comprising:

determining, by the software code executed by the processing hardware, whether the user has completed the at least one action; and prompting, by the software code executed by the processing hardware and using the UI, the user to perform the another action.

\*  \*  \*  \*  \*